(No Model.)
J. KENDRICK.
DETACHABLE HANDLE FOR VESSELS.
No. 452,121. Patented May 12, 1891.
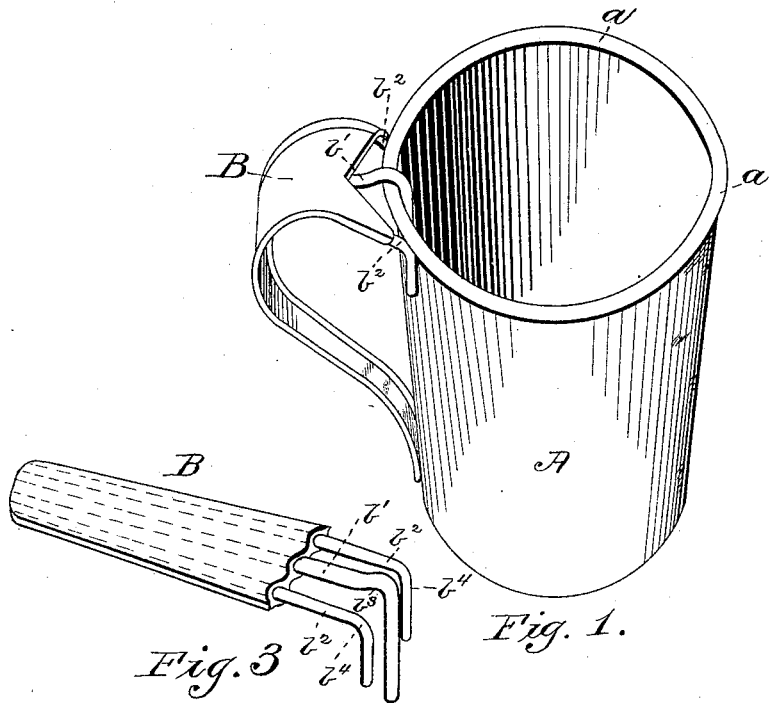
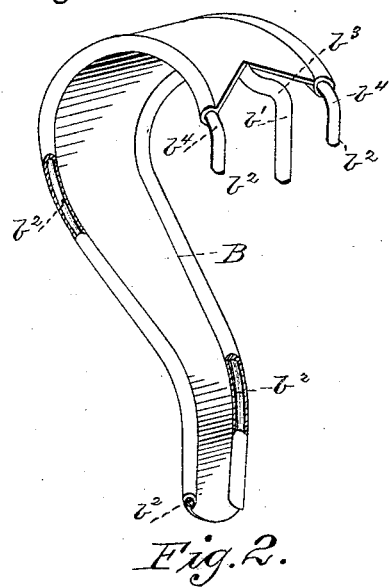
Witnesses
W. B. Harris
J. C. Wilson
Inventor
John Kendrick
by
Whitman + Wilkinson
Attorneys

UNITED STATES PATENT OFFICE.

JOHN KENDRICK, OF BATON ROUGE, LOUISIANA.

DETACHABLE HANDLE FOR VESSELS.

SPECIFICATION forming part of Letters Patent No. 452,121, dated May 12, 1891.

Application filed November 29, 1890. Serial No. 373,015. (No model.)

*To all whom it may concern:*

Be it known that I, JOHN KENDRICK, a citizen of the United States, residing at Baton Rouge, in the parish of East Baton Rouge and State of Louisiana, have invented certain new and useful Improvements in Detachable Handles for Vessels; and I do hereby declare the following to be a full, clear, and exact description of the invention, such as will enable others skilled in the art to which it appertains to make and use the same.

My invention relates to holders for tin vessels, and is more especially applicable to those having a wire ring or rim around the upper edge thereof.

The object of my invention is to provide a detachable handle which may be readily applied to the vessel and as readily removed therefrom.

The ordinary handles on tin vessels get hot when the vessel is placed upon a hot stove or the fire and need some non-conducting holders when the said vessel is to be moved; but I avoid this inconvenience by having a detachable handle which slips over and under the rim of the vessel and holds it firmly and securely. This will be more clearly understood by reference to the accompanying drawings, wherein the same parts are indicated by the same letters.

Figure 1 represents my detachable handle in use on a tin saucepan. Fig. 2 represents my detachable handle detached, parts of the sides being broken away to show the continuous wires. Fig. 3 represents another form of my device, being specially suitable where light vessels are to be lifted.

A represents the saucepan or other vessel to be lifted.

B represents my detachable handle, preferably made of tin, having three fingers $b'$ $b^2$ $b^2$, made of bent elastic wire, either turned or soldered in. These wires may be of any resilient metal, but are preferably of hard steel. The central wire or finger is stouter than the other two, as it is subjected to a greater strain than either of the other two. To give rigidity to the handle I preferably continue the two outer wires through it, as shown in the broken-away portions of Fig. 2. The center finger is somewhat longer than the other two, and its point is forward of the line joining the points of the other two.

To use the handle I slip the center finger inside and the two outer fingers outside of the rim $a$ of the vessel, and when $a$ gets up in the curved place $b^3$ of the center finger the curved edges $b^4$ of the side fingers spring up under the said rim and hold the vessel securely. With light vessels without a rim the mere friction of the three fingers is sufficient to lift the vessel with my device, and it may be advisable to serrate the clasping-faces of the three fingers to increase the friction.

It will be evident that while three fingers are sufficient any convenient number greater than two may be used, no more than two of said fingers being in the same plane.

Having now described my invention, what I claim, and desire to secure by Letters Patent, is—

1. A detachable handle having a metallic shank turned over at its edges, two wires made of resilient metal inclosed near one end in the said lapping edges and bent near the other in the form of fingers, and a third wire secured at one end to the said shank between the two outer wires and similarly bent at the other end, substantially as described.

2. In a detachable handle, the combination of a shank or holder with the outer wires $b^2$ $b^2$ and the central wire $b'$, all secured to the said shank, said wires being bent at $b^3$ and $b^4$, substantially as described.

In testimony whereof I affix my signature in presence of two witnesses.

JOHN KENDRICK.

Witnesses:
J. A. ADDISON,
H. N. SHERBURNE.